United States Patent [19]

Frisquet

[11] Patent Number: 4,729,405
[45] Date of Patent: Mar. 8, 1988

[54] COCK WITH AN INCORPORATED STOP-VALVE

[75] Inventor: Maurice Frisquet, Meaux, France

[73] Assignee: Frisquet, Société Anonyme, France

[21] Appl. No.: 24,675

[22] Filed: Mar. 11, 1987

[30] Foreign Application Priority Data

Mar. 12, 1986 [FR] France ................ 86 03492

[51] Int. Cl.⁴ .................................. F16K 11/10
[52] U.S. Cl. ...................... 137/614.17; 137/614.21
[58] Field of Search ............. 137/614.16, 614.17, 137/614.18, 614.19, 614.21

[56] References Cited

U.S. PATENT DOCUMENTS

| | | | |
|---|---|---|---|
| 1,381,766 | 6/1921 | Tohin et al. | 137/614.17 |
| 3,426,795 | 2/1969 | Muller | 137/614.17 |
| 4,187,872 | 2/1980 | Freeman et al. | 137/614.17 X |
| 4,311,170 | 1/1982 | Dolan | 137/614.17 |

Primary Examiner—A. Michael Chambers
Assistant Examiner—John C. Fox

[57] ABSTRACT

A cock with incorporated stop-valve comprises a hollow body having aligned admission and discharge ports and a cylindrical bore which opens between the admission and discharge orifices, a cock head provided with a normally stationary member mounted within the cylindrical bore, and a valve provided with a sealing ring, which can be displaced towards and away from a valve seat for regulating the flow of fluid through the cock. A cylindrical sleeve mounted within the bore of the hollow body between this latter and the stationary member of the cock head can be displaced axially towards and away from an annular seat formed in the hollow body opposite to the inner end of the sleeve. When it is applied against the annular seat, the cylindrical sleeve constitutes a stop-valve which is incorporated with the cock and permits replacement of the sealing ring after withdrawal of the cock head.

12 Claims, 8 Drawing Figures

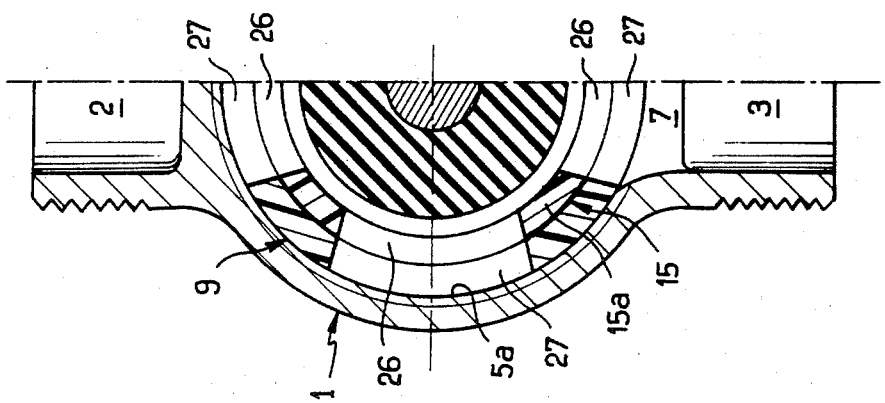
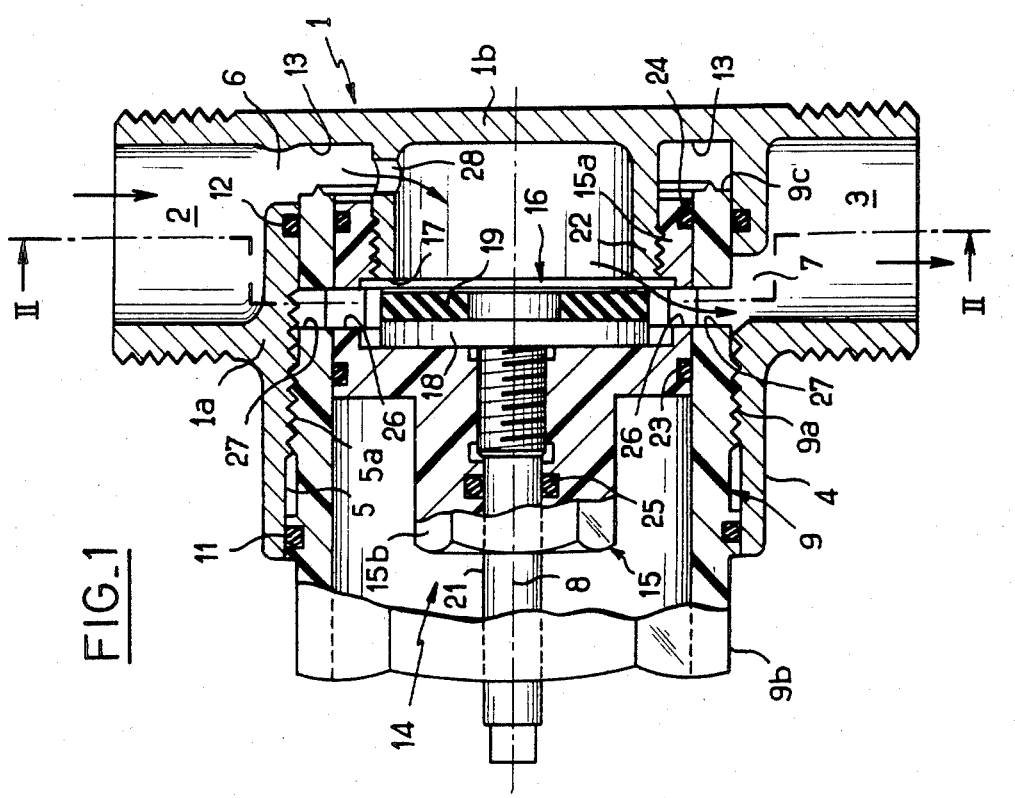

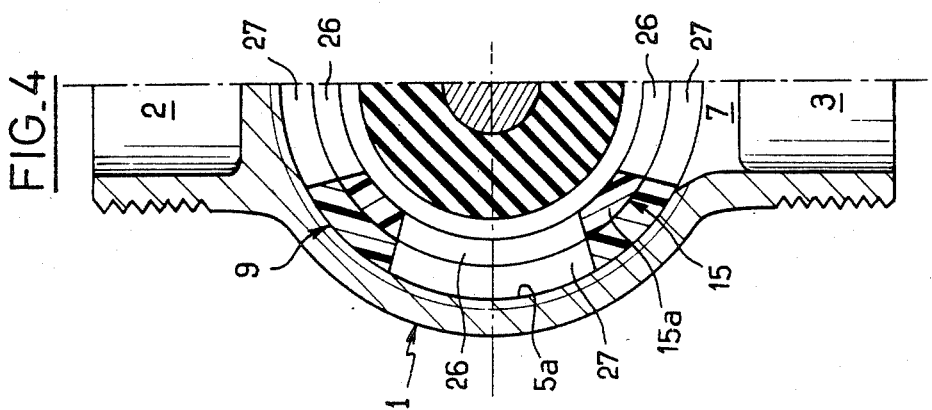
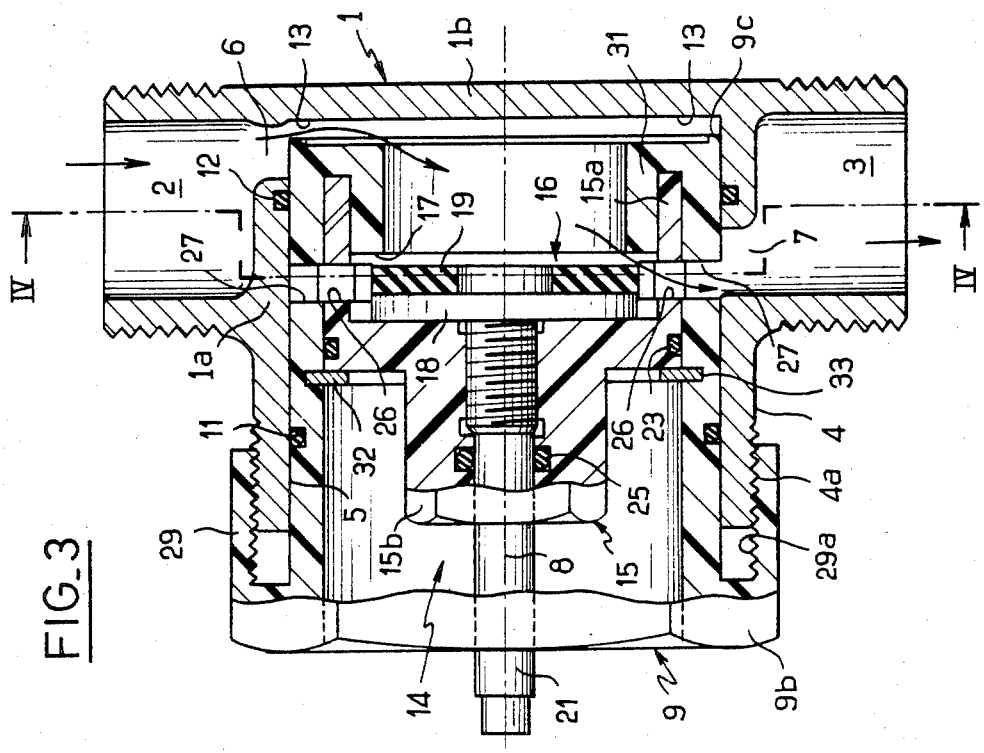

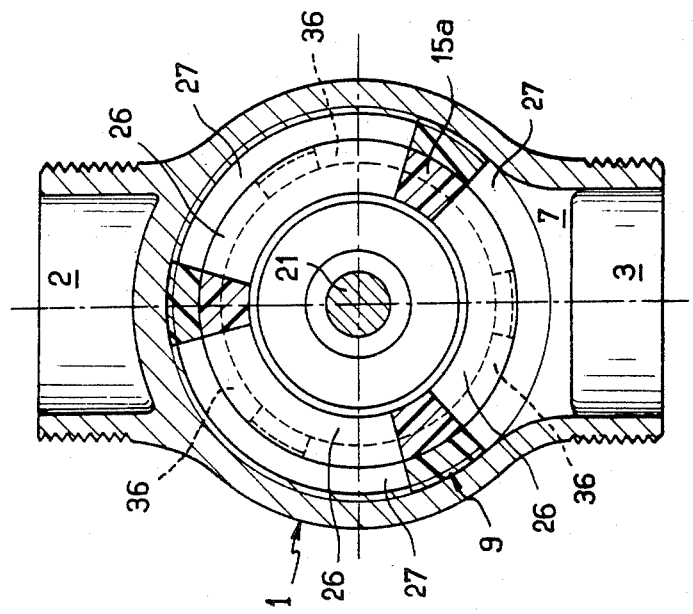
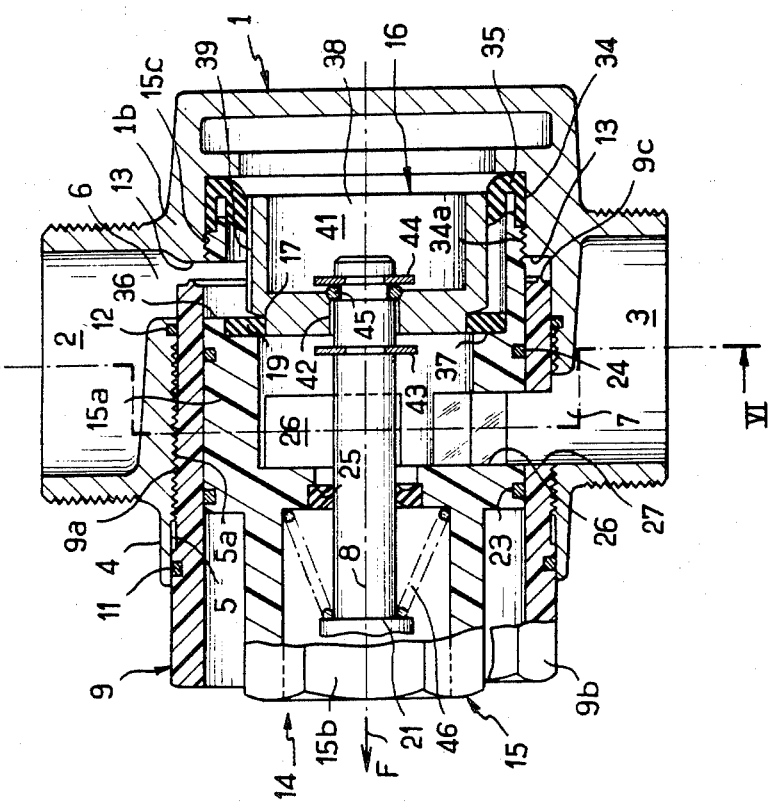

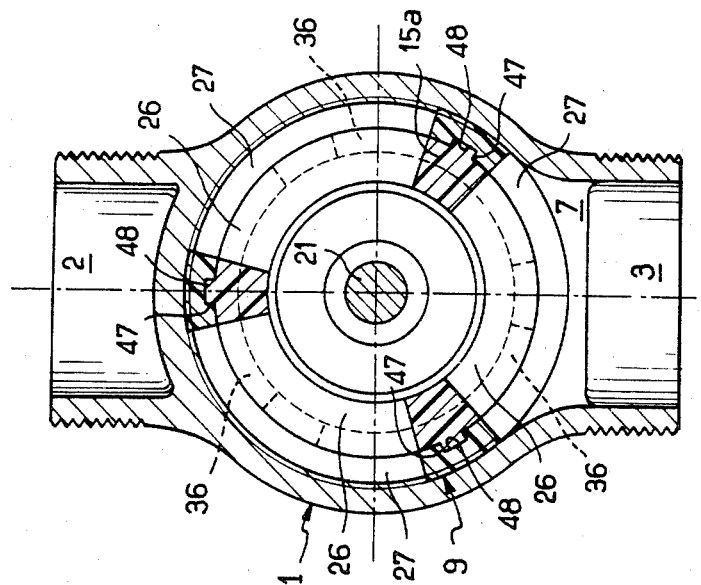
FIG_8
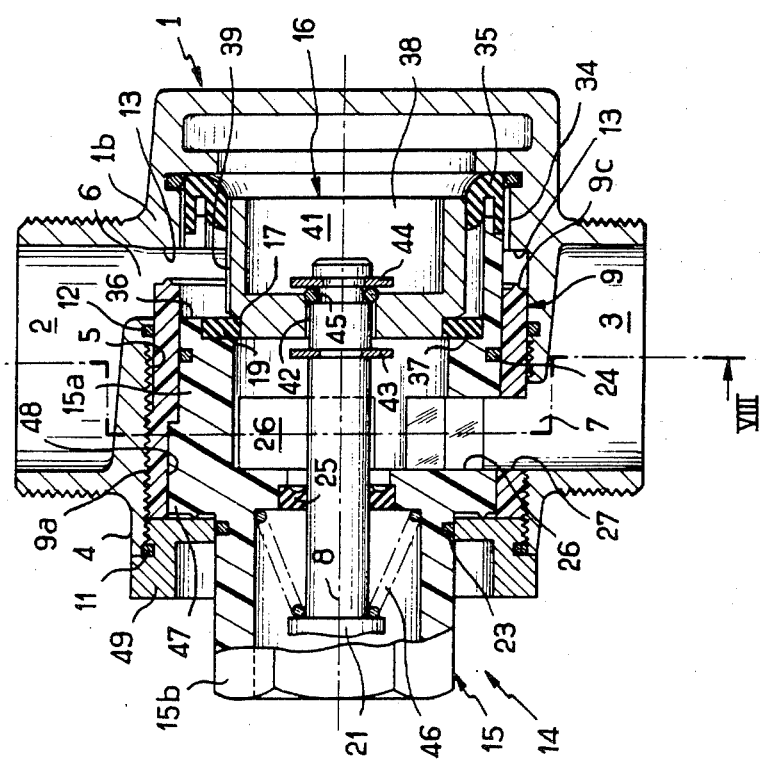
FIG_7

COCK WITH AN INCORPORATED STOP-VALVE

BACKGROUND OF THE INVENTION

1. Field of the Invention

The present invention relates to a cock of the type comprising a hollow body having aligned admission and discharge orifices for a fluid to be controlled, and a cylindrical bore which is formed within a lateral wall of the hollow body and opens into this latter between the admission and discharge orifices, a cock head having a normally stationary member which is mounted within said bore, and a valve member movably mounted within said stationary member and displaceable towards and away from a valve seat in order to control the rate of flow of fluid.

The invention is primarily and not exclusively applicable to installations for the distribution of sanitary water.

2. Description of the Prior Art

When the seal of the movable valve member or of the associated seat of a cock for controlling the supply of water to a utilization appliance is worn, the seal has to be replaced. It is accordingly necessary to cut-off the water within the water-supply circuit of the appliance upstream of the cock whose seal has to be replaced. It is for this reason that water distribution installations are usually provided with at least one general stop-valve which controls the water supply to the entire installation. In addition, when the installation has a branched structure, it may prove necessary in such a case to provide at least one other stop-valve at the starting point of each main branch of the installation. When a single general stop-valve is provided, a change of seal of a cock entails the need to cut-off the water supply to the entire installation, with the result that all utilization appliances connected to the installation are deprived of water during the time required to replace the defective seal. The same situation arises when a stop-valve is provided in each main branch of the installation. In this instance, however, the only utilization appliances to be deprived of water during the time required to change a defective seal are those connected to the branch in which the stop-valve is closed. Furthermore, when a stop-valve is provided in each main branch of the installation and if this installation has a large number of main branches, it is necessary in such a case to provide a corresponding number of stop-valves, thus increasing the cost of the installation (parts and labor cost). Moreover, in both cases, the stop-valve is seldom located in the immediate vicinity or even in the same room as the cock in which a defective seal is to be replaced. A change of seal thus involves the need to walk back and forth at frequent intervals between the cock whose seal is to be changed and the stop-valve, which represents a waste of time.

In order to overcome the disadvantages mentioned in the foregoing, one obvious possibility would consist in mounting a stop-valve in the immediate vicinity of each cock and in series with this latter in order to permit ready replacement of the cock seal whenever the need arises. However, this would produce a substantial increase in overall cost of the installation.

The object of the present invention is therefore to provide a cock which has its own incorporated stop-valve without entailing any appreciable increase in overall cost of the fluid distribution installation.

SUMMARY OF THE INVENTION

The cock in accordance with the present invention essentially comprises in addition a cylindrical sleeve placed within the bore of the hollow body between this latter and the stationary member of the cock head and axially movable towards and away from another seat of annulsr shape formed in the hollow body opposite to the inner end of the cylindrical sleeve on an outer lateral wall of said hollow body opposite to the lateral wall in which said cylindrical bore is formed.

Thus, when the cylindrical sleeve is located in a first position at a distance from said annular seat, the fluid such as water, for example, can circulate normally through the cock when the movable valve member itself is moved away from the associated valve-seat. On the other hand, when the cylindrical sleeve is located in a second position in contact with said annular seat the admission orifice or cock inlet is shut-off and the cock head can be withdrawn from the body for the purpose of replacing the defective seal.

Thus a single additional part incorporated in the cock and consisting of said cylindrical sleeve makes it possible to combine within a single cock two functions, namely a flow-arresting function and a flow-regulating function, which were performed in the prior art by means of two separate cocks. This design solution is clearly less costly than would have been the case if it had been necessary to associate with each utilization appliance both a flow-regulating cock and a stop-valve which is separate and distinct from the flow-regulating cock. The invention accordingly makes it possible to associate with each utilization appliance a cock having its own incorporated stop-valve without unduly increasing the cost of the water distribution installation, particularly by virtue of the fact that it is possible to dispense with the need for a stop-valve in each main branch of the installation and that it would even be possible to provide only a single general stop-valve. Furthermore, since the cock in accordance with the present invention has its own incorporated stop-valve, any defective cock seal can be replaced much more readily than had hitherto been the case when a stop-valve was not located in proximity to the cock in which a seal replacement had become necessary.

BRIEF DESCRIPTION OF THE DRAWINGS

FIG. 1 is a longitudinal sectional view of a cock in a first embodiment of the invention.

FIG. 2 is a sectional half-view taken along line II—II of FIG. 1.

FIG. 3 is a longitudinal sectional view of a cock in a second embodiment of the invention.

FIG. 4 is a sectional half-view taken along line IV—IV of FIG. 3.

FIG. 5 is a longitudinal sectional view of a cock in a third embodiment of the invention.

FIG. 6 is a sectional view taken along line VI—VI of FIG. 5.

FIG. 7 is a longitudinal sectional view of a cock in a fourth embodiment of the invention.

FIG. 8 is a sectional view taken along line VIII—VIII of FIG. 7.

DESCRIPTION OF THE PREFERRED EMBODIMENTS

The cock shown in FIGS. 1 and 2 has a hollow body 1 with an inlet 2 and an outlet 3 for a fluid such as water, for example, the flow rate of which is to be controlled. The cock body 1 is provided on its lateral wall 1a with a lateral boss 4 having a bore 5 therein, which is provided over part of its length with an internally threaded portion 5a. The bore 5 communicates with the inlet 2 and the outlet 3 respectively through passages 6 and 7 which are relatively offset in the direction of the longitudinal axis 8 of the bore 5, the passage 7 being located close to the lateral wall 1a of the cock body 1 whilst the passage 6 is located close to the lateral wall 1b of said body 1, that is to say the wall located opposite to the wall 1a.

A cylindrical sleeve 9 formed of plastic material, for example, and threaded externally at 9a over an intermediate portion of its length is threadedly engaged into the internally threaded bore 5. In order to facilitate screwing and unscrewing of the sleeve 9, its external portion 9b which projects from the cock body 1 can have a hexagonal shape, for example, as shown in the left-hand portion of FIG. 1. Two O-ring seals 11 and 12 are fitted between the cylindrical sleeve 9 and the cock body 1 respectively at the ends of the bore 5. A seat 13 of annular shape is formed within the body 1 opposite to the inner end 9c of the cylindrical sleeve 9. By way of example, the annular seat 13 can consist of a simple flat annular surface machined on the internal face of the lateral wall 1b.

Within the cylindrical sleeve 9 is mounted a cock head 14 which essentially includes a normally stationary member 15 and a valve 16. Said valve is movably mounted within the stationary member 15 and can be displaced towards and away from a valve seat 17. As shown in FIG. 1, the valve 16 can be constituted by a disk 18, one face of which is adapted to carry an annular seal 19. Said disk 18 is rigidly fixed to one end of a partially threaded valve-operating stem 21 which is screwed into the stationary member 15, the other end of said operating stem being adapted to carry an operating handle (not shown in the drawings).

The stationary member 15 of the cock head 14 has an internally threaded hollow cylindrical portion 15a which is slidably engaged in the cylindrical sleeve 9 and screwed on an externally threaded hollow internal cylindrical projection 22 of the cock body 1. The hollow cylindrical projection 22 extends inwards from the wall 1b of the body 1 over part of the length of the bore 5 in coaxial relation therewith and its free end forms a valve seat 17. In order to permit screwing and unscrewing of the stationary member 15 of the cock head 14 on the hollow cylindrical projection 22 of the body 1, a portion 15b of said stationary member has an external diameter which is smaller than the internal diameter of the cylindrical sleeve 9 and has a hexagonal shape, for example, as shown in the left-hand portion of FIG. 1.

Two O-ring seals 23 and 24 are placed between the sleeve 9 and the hollow cylindrical portion 15a respectively at the ends thereof. Another O-ring seal 25 is placed between the portion 15b and the operating stem 21. The hollow cylindrical portion 15a is provided with a plurality of discharge ports 26 (for example four ports, only three of which are shown in FIG. 2) which are spaced circumferentially in the periphery of said cylindrical portion and are located between the O-ring seals 23 and 24. Similarly, the sleeve 9 is provided between the seals 11 and 12 with a plurality of discharge ports 27 (four ports, for example) which are spaced circumferentially in the periphery of said sleeve. The dimensions of the discharge ports 26 and 27 in the circumferential direction are chosen so as to ensure that said ports overlap at least to a partial extent irrespective of the relative angular position of the sleeve 9 and of the hollow cylindrical portion 15a when said sleeve 9 occupies the axial position shown in FIG. 1. Furthermore, the hollow cylindrical projection 22 of the cock body 1 has at least one admission port 28 which communicates with the inlet 2 of the body 1 through the passage 6.

The operation of the cock described in the foregoing is such that, when the cylindrical sleeve 9 occupies the position shown in FIG. 1 and the valve 16 is moved away from the seat 17, the fluid such as water, for example, is permitted to flow freely from the inlet 2 to the outlet 3 of the cock body 1 and follows the path indicated by the arrows. The rate of flow of water can be regulated by displacing the valve 16 from the seat 17 to a greater or lesser extent by means of the operating stem 21. It will further be noted that, when the valve 16 is in the fully open position, the maximum delivery of the cock can be adjusted by means of the cylindrical sleeve 9 by screwing or unscrewing said sleeve within the internally-threaded bore 5 so as to ensure that the sleeve end 9c is located in greater or lesser proximity to the annular seat 13. When the valve seal 19 is worn and has to be replaced, it is only necessary to screw the sleeve 9 right home within the threaded bore 5 so that the sleeve end 9c thus comes into contact with the annular seat 13. At this moment, the inlet passage 6 is shut-off and the water can no longer reach the valve 16. Under these conditions, the hollow cylindrical portion 15a can be unscrewed from the hollow cylindrical projection 22 by rotating the portion 15b in the direction of unscrewing by means of a suitable spanner and the cock head 14 can then be withdrawn from the sleeve 9 by slidingly disengaging it from said sleeve, whereupon the seal 19 can readily be replaced by a new seal. Once the seal 19 has been changed, the cock head 14 can then be placed back in position by carrying out the operations described in the foregoing but in the reverse order, whereupon the sleeve 9 is partially unscrewed and the cock is then ready for further service.

In the cock shown in FIGS. 3 and 4, the elements which are identical or perform the same function as those of the cock of FIGS. 1 and 2 are designated by the same reference numerals and will not be described again in detail. The cock of FIGS. 3 and 4 differs from that of FIGS. 1 and 2 in that the cylindrical sleeve 9 is slidably mounted for axial movement within the bore 5, both the internal surface of said bore and the external surface of the sleeve 9 being completely smooth. On the other hand, the lateral boss 4 is externally threaded at 4a and the cylindrical sleeve 9 is provided at the outer end thereof with an outer cylindrical collar 29 which is provided with an internally threaded portion 29a and screwed on the externally threaded portion 4a of the boss 4. Thus, by screwing the outer cylindrical collar 29 on the threaded portion 4a of the boss 4, the inner end 9c of the sleeve 9 can be brought into contact with and pressed against the annular seat 13 in order to shut-off the inlet passage 6. Conversely, by unscrewing the cylindrical collar 29, the end 9c of the sleeve 9 can be moved away from the annular seat 13 in order to permit normal operation of the cock. As shown in the left-hand portion of FIG. 3, the cylindrical collar 29 may have a hexagonal external shape, for example, in order to permit screwing and unscrewing of said collar by means of a suitable spanner.

Furthermore, the cylindrical sleeve 9 of the cock shown in FIGS. 3 and 4 is provided at the inner end with an inner cylindrical collar 31 which forms the seat 17 for the valve 16. The hollow cylindrical portion 15a of the cock head 14 is slidably engaged within the sleeve 9 and retained axially in both directions between the inner cylindrical collar 31 and an annular stop 32 such as, for example, a split ring of the circlip type which is detachably fixed by resilient snap-action engagement within a circular groove 33 of the cylindrical sleeve 9. In this form of construction, the O-ring seal 24 which had to be provided in the cock of FIGS. 1 and 2 can be dispensed with since the inner cylindrical collar 31 forms an integral part of the sleeve 9. It will be noted that the stationary member 15 of the cock head 14 can be detachably mounted within the cylindrical sleeve 9 in a number of different ways. For example, the circlip 32 can be replaced by an externally threaded ring and screwed into the cylindrical sleeve 9. In this case, the internal surface of said sleeve is threaded over part of its length. In another alternative form of construction, the hollow cylindrical portion 15a can be threaded either internally or externally and screwed either on the cylindrical collar 31 which is accordingly provided with a threaded external surface or within the sleeve 9, the internal surface of which is in this case threaded over part of its length in the vicinity of its inner end.

In the cock of FIGS. 5 and 6, the elements which are identical or which perform the same function as in the cocks described earlier are designated by the same reference numerals and will not be described again in detail. The cock of FIGS. 5 and 6 differs from the cock of FIGS. 1 and 2 in that a cylindrical blind-end cavity 34 is formed in the lateral wall 1b of the cock body 1 and is threaded internally at 34a, and in that the hollow cylindrical portion 15a of the stationary portion 15 of the cock head 14 is threaded externally at 15c at the inner end thereof. The hollow cylindrical portion 15a is slidably engaged within the cylindrical sleeve 9 and partially engaged and screwed within the threaded cavity 34, a seal 35 being placed between the body 1 and the inner end of the hollow cylindrical portion 15a. Moreover, the hollow cylindrical portion 15a is provided with a plurality of admission ports 36 such as, for example, three ports which are axially offset from the discharge ports 20 and distributed circumferentially in the periphery of said cylindrical portion close to the inner end thereof. At least one of the ports 36 is adapted to communicate with the inlet passage 6 when the inner end 9c of the cylindrical sleeve 9 is moved away from the annular seat 13 and located in spaced relation to this latter. The O-ring seal 24 is placed between the admission ports 36 and the discharge ports 26. Furthermore, in the cock shown in FIGS. 5 and 6, an annular shoulder 37 is formed in the internal surface of the hollow cylindrical portion 15a between the admission ports 36 and the discharge ports 26. The annular shoulder 37 is provided with an annular seal 19 which forms the seat 17 for the movable valve 16.

The cock shown in FIGS. 5 and 6 can be designed as an automatic timed-closure valve. In this case, the movable valve 16 is constituted by a hollow piston 38 slidably mounted in the annular seal 35 and provided with a calibrated longitudinal groove 39 formed in the external cylindrical surface of said piston. Said groove 39 forms a controlled leakage passageway through which the water derived from the inlet 2 is permitted to pass at a low rate of flow towards the chamber 41 formed within the hollow piston 38. The end-wall of said piston 38 is provided with a bore 42 in which the inner end of the operating stem 21 is freely engaged, the external diameter of said stem being slightly smaller than the internal diameter of the bore 42. Two circlips 43 and 44 disposed in axially spaced relation on the operating stem 21 serve to limit the axial movement of said operating stem with respect to the piston 38. The circlip 44 forms a valve in conjunction with an O-ring seal 45 and with the bore 42. An operating push-button (not shown in the drawings) is fixed at the other end of the operating stem 21. A compression spring 46 urges the stem 21 in the direction of the arrow F in order to ensure that the valve formed by the circlip 44, the O-ring seal 45 and the bore 42 is maintained in the closed position when no pressure is exerted on the push-button. The spring 46 also performs a contributory function in initiating closure of the movable valve 16 when the push-button is released.

The operation of an automatic timed-closure valve cock of this type is well-known (as described, for example, in French Pat. No. 2,367,971). It is consequently not considered useful to describe its operation here inasmuch as it does not have a direct bearing on the present invention. It will simply be noted that, when the cyclindrical sleeve 9 is in a position spaced away from the annular seat 13, the cock is capable of operating in the normal manner. In other words, the fluid (usually consisting of water) can be delivered by the cock during a predetermined time interval simply by exerting pressure for a short period of time on the push-button which is secured to the operating stem 21. When it is desired to change the seal 19, the initial operation consists in screwing the cylindrical sleeve 9 within the internally-threaded bore 5 in order to apply the sleeve end 9c against the annular seat 13. The stationary member 15 of the cock head 14 can then be unscrewed with respect to the internally-threaded cavity 34, whereupon the cock head 14 may be withdrawn from the sleeve 9 in a sliding movement. When the circlip 44 and the seal 45 have been removed, the piston 38 can be separated from the operating stem 21 and the defective seal 19 can be replaced by a new seal. The different elements of the cock can then be put back in position by performing the operations described in the foregoing but in the reverse order. When the cylindrical sleeve 9 has been partially unscrewed, the cock is again ready for use.

In the three cocks described in the foregoing, the cylindrical sleeve 9 is displaced axially towards and away from the annular seat 13 by actuating the cylindrical sleeve itself. Consideration will now be given to a method of moving the cylindrical sleeve towards and away from the associated annular seat 13 by producing action, not on the sleeve itself but on the member 15 of the cock head 14. In the cock shown in FIGS. 7 and 8 and having a structure which is similar to that of the cock shown in FIGS. 5 and 6, the elements which are identical or perform the same function as those of the cock of FIGS. 5 and 6 are designated by the same reference numerals. The cock of FIGS. 7 and 8 differs from the cock of FIGS. 5 and 6 in the fact that the cylindrical blind-end cavity 34 of the cock body 1 is no longer provided with an internal screw-thread, the inner end of the hollow cylindrical portion 15a of the member 15 of the cock head 14 being simply slidably engaged and rotatably mounted within the cavity 34. Furthermore, the sleeve 9 and the hollow cylindrical portion 15a are mechanically coupled so as to rotate together, with the result that a rotation of the stationary member 15 of the cock head 14 produces an axial movement of the sleeve 9 by screwing or unscrewing of this latter within the internally-threaded bore 5 of the cock body 1. By way of example, the coupling between the sleeve 9 and the cylindrical portion 15a can consist of ribs 47 which extend in the longitudinal direction at the periphery of the hollow cylindrical portion 15a. Said ribs 47 are engaged within grooves 48 which extend longitudinally in the internal cylindrical surface of the sleeve 9 over part of the length thereof. An externally-threaded annular end-plug 49 is screwed into the outer end portion of the internally-threaded bore 5 of the cock body 1. In this case, the sealing ring 11 is placed between the annular end-plug 49 and the body 1 at the outer end of the bore 5, whilst the seal 23 is placed between the annular end-plug 49 and the member 15 of the cock head 14.

It will be readily apparent that the different embodiments of the present invention as described in the foregoing have been given solely by way of example without any limitation being implied and that any number of modifications may readily be made by those versed in the art without thereby departing either from the scope or the spirit of the invention. From this it follows in particular that, in the cock of FIGS. 1 and 2 and in the cock of FIGS. 5 and 6, the bore 5 and the sleeve 9 need not be threaded respectively internally and externally but can be smooth-walled as in the example of the cock shown in FIG. 3. In this case the lateral boss 4 can be threaded and the sleeve 9 can be provided with an internally-threaded external cylindrical collar in the same manner as the collar 29 of the cock shown in FIG. 3. In another alternative form of construction of the cock which is illustrated in FIGS. 1 and 2, the hollow cylindrical projection 22 of the body 1 can be dispensed with, in which case the valve seat 17 can consist of an internal cylindrical collar which forms an integral part of the sleeve 9 in the same manner as the collar 31 of FIG. 3. Furthermore, instead of being designed for time-delayed automatic closing action, the cock of FIGS. 5 and 6 or the cock of FIGS. 7 and 8 can be designed simply in the form of ordinary cocks. In this case, the annular seal 35 is suppressed, the hollow piston 38 is replaced by a valve which is rigidly fixed to the operating stem 21 and this latter is no longer mounted for axial sliding movement within the stationary member 15 of the cock head but is screwed therein in accordance with an arrangement similar to that shown in FIGS. 1 and 3.

What is claimed is:

1. A cock comprising a hollow body having aligned admission and discharge orifices for a fluid to be controlled and a cylindrical bore which is formed within a first lateral wall of the hollow body and opens into said hollow body between the admission and discharge orifices, and a cock head having a normally stationary member which is mounted within said bore, a valve movably mounted within said stationary member and displaceable towards and away from a valve seat in order to control the rate of flow of fluid, and a cylindrical sleeve placed within the bore of the hollow body between said body and said stationary member of the cock head and axially displaceable towards and away from an annular seat said annular seat being formed within the hollow body opposite to the inner end of the cylindrical sleeve on a second lateral wall of said body opposite to the first lateral wall in which said cylindrical bore is formed.

2. A cock according to claim 1, wherein the cylindrical sleeve is threaded externally over part of its length and is screwed within the bore of the hollow body, said bore being threaded internally over part of its length.

3. A cock according to claim 2, wherein the stationary member of the cock head has a hollow cylindrical portion which is slidably engaged within the sleeve, said hollow cylindrical portion being partially slidably engaged and rotatably mounted within a cylindrical blind-end cavity formed in the second lateral wall of the hollow body, and wherein said sleeve and said hollow cylindrical portion are mechanically coupled so as to rotate together and so that a rotation of the stationary member of the cock head produces an axial movement of the sleeve by screwing or unscrewing of said sleeve within the internally-threaded bore of the hollow body.

4. A cock according to claim 3, wherein the coupling between said sleeve and said hollow cylindrical portion is constituted by ribs which extend in the longitudinal direction at the periphery of the hollow cylindrical portion and which are engaged within grooves which extend longitudinally within the internal cylindrical surface of the sleeve over part of the length of said sleeve.

5. A cock according to claim 3, wherein an externally-threaded annular end-plug is screwed into the outer end of the threaded bore of the hollow body, wherein a first sealing ring is placed between the threaded annular end-plug and the hollow body at the outer end of the bore, a second sealing ring is placed between the sleeve and the hollow body at the inner end of the bore, a third sealing ring is placed between the threaded annular end-plug and the stationary member of the cock head, and a fourth sealing ring is placed between the sleeve and the hollow cylindrical portion in an intermediate portion thereof.

6. A cock according to claim 1, wherein the bore is smooth-walled and formed within an externally threaded lateral boss of the hollow body and wherein the cylindrical sleeve is slidably mounted for axial movement within the bore of the hollow body and is provided at the outer end thereof with an external cylindrical collar with an internal screw-thread which is screwed on the external threaded portion of said boss.

7. A cock according to claim 1, wherein the stationary member of the cock head has an internally threaded hollow cylindrical portion which is slidably engaged within the cylindrical sleeve and screwed on an externally threaded hollow internal cylindrical projection which extends from said second lateral wall of the cock body over part of the length of the cylindrical bore of said body in coaxial relation thereto and forms said seat for the movable valve, there being formed in the periphery of said hollow internal cylindrical projection at least one admission port which communicates with said admission orifice of the cock body.

8. A cock according to claim 7, wherein first and second sealing rings are placed between the cylindrical sleeve and the hollow body respectively at the inner and outer ends of the bore, wherein at least a third sealing ring is placed between the sleeve and the hollow cylindrical portion at the outer end thereof, wherein said hollow cylindrical portion has a plurality of discharge ports circumferentially distributed in the periphery of said cylindrical portion between the inner end thereof and the third sealing ring, and wherein the cylindrical sleeve is further provided in its periphery between the first and second sealing rings with a plurality of circumferentially spaced discharge ports which overlap the discharge ports of said hollow cylindrical portion at least to a partial extent and at least one of which communicates with the discharge orifice of the hollow body.

9. A cock according to claim 1, wherein the cylindrical sleeve is provided at the inner extremity thereof with an inner cylindrical collar which forms said seat for the movable valve, and wherein the stationary member of the cock head has a hollow cylindrical portion which is concentrically and detachably fixed within said cylindrical sleeve.

10. A cock according to claim 9, wherein said hollow cylindrical portion is slidably engaged within the cylindrical sleeve and retained axially between the inner collar of the sleeve and an annular stop which is detachably fixed within said sleeve.

11. A cock according to claim 1, wherein the stationary member of the cock head has a hollow cylindrical portion provided at the inner end thereof with an external screw-thread and slidably engaged within the cylindrical sleeve, said hollow cylindrical portion being partially engaged and screwed in an internally threaded cylindrical blind-end cavity formed in the second lateral wall of the hollow body, wherein first and second sealing rings are placed between the sleeve and the hollow body respectively at the outer and inner ends of the bore, and wherein third and fourth sealing rings are placed between the sleeve and the hollow cylindrical portion respectively at the outer end and in an intermediate portion of said hollow cylindrical portion.

12. A cock according to claim 11, wherein the hollow cylindrical portion has a plurality of admission ports circumferentially distributed in the periphery thereof and near the inner end of said hollow cylindrical portion, at least one of the admission ports communicating with the admission orifice of the hollow body, a plurality of discharge ports which are circumferentially distributed in the periphery of said cylindrical portion between the third and fourth sealing rings and which are axially spaced with respect to the admission ports, the fourth sealing ring being located between the admission ports and the discharge ports, and an annular shoulder which is formed in the internal surface of the hollow cylindrical portion between the admission ports and the discharge ports and which is provided with an annular seal forming said seat for the movable valve, and wherein the sleeve is also provided in its periphery between the first and second sealing rings with a plurality of circumferentially distributed discharge ports which overlap the discharge ports of said hollow cylindrical portion at least to a partial extent and at least one of which communicates with the discharge orifice of the hollow body.

* * * * *